No. 892,658. PATENTED JULY 7, 1908.
B. J. FOY.
SIGN.
APPLICATION FILED DEC. 12, 1907.
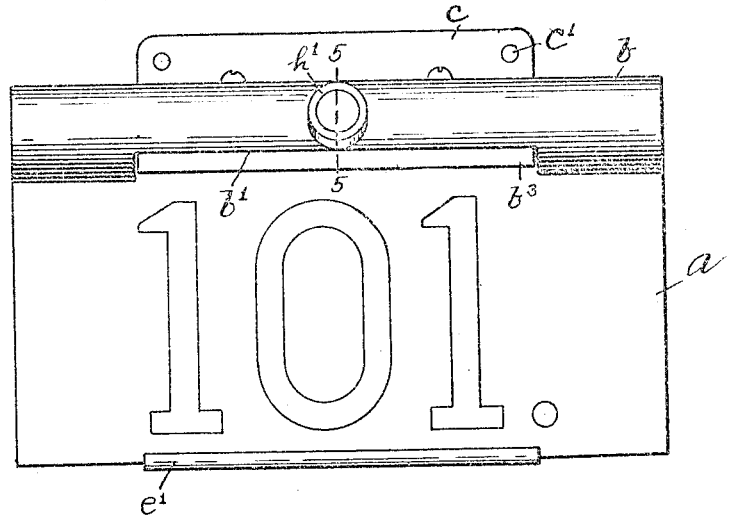
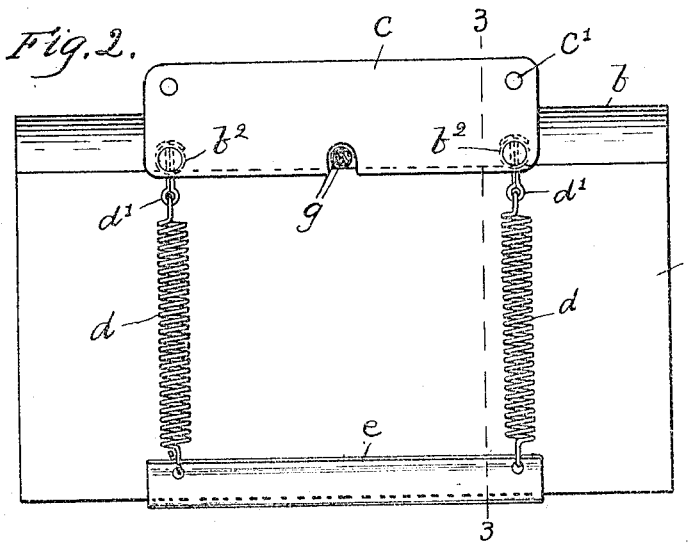
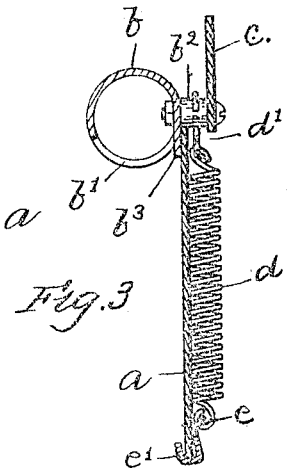
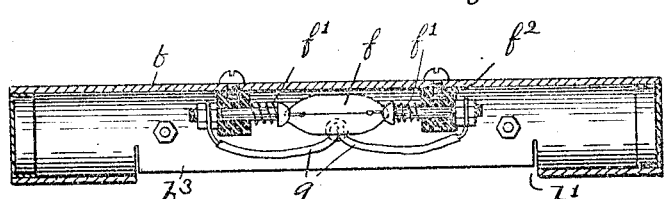
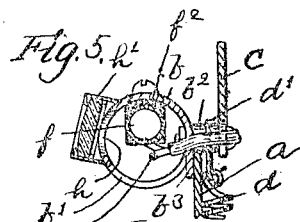
Witnesses:
H. B. Davis
Cynthia Doyle
Inventor:
Bernard J. Foy
by Royer & Hermann
Attys

UNITED STATES PATENT OFFICE.

BERNARD J. FOY, OF BROOKLINE, MASSACHUSETTS.

SIGN.

No. 892,658.  Specification of Letters Patent.  Patented July 7, 1908.

Application filed December 12, 1907. Serial No. 406,209.

*To all whom it may concern:*

Be it known that I, BERNARD J. FOY, of Brookline, county of Norfolk, State of Massachusetts, have invented an Improvement in Signs, of which the following description, in connection with the accompanying drawings, is a specification, like characters on the drawings representing like parts.

This invention relates to automobile signs and has for its object to provide means for securely yet detachably holding a sign-plate in such manner that it may be quickly detached for the purpose of replacing it by another sign; also to provide a light box above the sign-plate having an opening through which the direct rays of white light may be projected onto the sign-plate, and means for supporting a single electric light therein; also to provide the light box with a colored lens which is arranged opposite the light which is contained therein, so that the rays of light may be projected through said lens and observed from the rear of the automobile, a single electric-light being thus employed to illuminate the sign-plate and to also serve as the rear signal light.

Figure 1 is a front elevation of an automobile sign embodying this invention. Fig. 2 is a rear side elevation of the sign shown in Fig. 1. Fig. 3 is a vertical section of the sign shown in Fig. 2, taken on the dotted line 3—3 looking toward the right. Fig. 4 is a longitudinal vertical section of the light box. Fig. 5 is a transverse section of the light box taken on the dotted line 5—5 Fig. 1.

$a$ represents the sign-plate of any usual or suitable shape and design.

$b$ represents the light box, which is made cylindrical or of other suitable shape. This box is arranged at the top of the sign-plate and has an opening along its under side, as at $b^1$, for the purpose of directing the rays of light down onto the sign-plate.

The light box is secured to the upper support for the sign plate. Said upper support consists essentially of a supporting-plate $c$ provided with holes $c'$ for bolts or screws by which it may be secured to the body of an automobile, and posts $b^2$, $b^2$, which extend forward from the plate, and the light box is secured to said posts.

The light box is formed with a lip $b^3$ at the rear edge of the opening $b'$ which extends downward a short distance directly in front of the posts $b^2$. A pair of long spiral springs $d$ are provided, the upper ends of which are attached to cotter-pins $d'$ which extend through the posts $b^2$, or they may be otherwise attached to the upper support. The lower ends of said springs are attached to the lower support for the sign plate, as for instance, as here shown, they are attached to a lip $e$ extending outwardly from the rear upper edge of an engaging-clip $e'$ which is provided for engaging the lower edge of the sign-plate. The engaging-clip $e'$ is formed with a recess of suitable width to receive sign-plates of different thicknesses to thereby engage the many different sign-plates now in common use. The upper edge of the sign-plate engages the posts $b^2$, of the upper support, between the lip $b^3$ on the light box and the cotter-pins, and as said lip and cotter pins hold the upper end of the sign plate respectively against forward and backward movement, they form, in reality, a part of the upper support, for the sign plate.

The springs $d$ act to draw up the clip $e'$ and thereby to raise the sign-plate into engagement with the posts $b^2$ or other forward extensions on the supporting-plate, and also act to thrust said sign-plate against the lip $b^3$ and against one wall of the clip, to thereby hold it firmly in position and against rattling. By extending the lip $e$ in an outward direction from the engaging-clip it will be observed that said clip may be turned to occupy different positions by the action of the springs, to engage sign-plates of different thicknesses.

A single electric-light $f$ is arranged in the light box, it being made as a bulb having terminals for the filament at its opposite ends. This bulb is held in position by means of a pair of spring actuated posts $f'$, which engage its ends and electric connection is established with the filament by means of said terminal posts. The terminal posts $f''$ have their bearings in blocks $f^2$ of insulating material which are located within the light box and which are secured thereto by screws or other suitable means, said blocks being arranged so as to support the terminal posts in alinement in order that they may hold the bulb between them.

$g$, $g$, represent the electric wires which are respectively connected to the outer ends of the terminal posts $f''$, said wires entering the light box through a hole made for this purpose.

The electric-light $f$ is located in the light box at a point substantially midway the length of the bottom opening $b'$, so that the rays thereof may project through said opening onto the sign-plate. An opening is made in the side of the light box directly opposite the light, which is represented at $h$, and a colored lens is supported in front of said opening, it being held by a suitably flanged collar $h'$ which is provided for the purpose and which is secured to the light box, projecting therefrom a short distance as shown in Fig. 5. By thus locating the colored lens the rays of light from the electric-light project therefrom, and provide a signal light at the rear of the automobile. It will thus be observed that by means of a single electric-light, arranged as herein shown, the sign-plate is illuminated from above and a signal-light is provided.

Having thus described my invention, what I claim as new and desire to secure by Letters Patent is:—

1. A sign-plate holder consisting of an upper support adapted to be stationarily secured to an object, having means for engaging the upper edge of the sign-plate and having means extending over the front of the upper edge of the sign-plate and an engaging-clip having a longitudinal recess for receiving the lower edge of the sign-plate, and spiral springs connecting said clip with the upper support for drawing the clip toward the upper support to hold the sign-plate between them, substantially as described.

2. A sign-plate holder consisting of a supporting-plate adapted to be stationarily secured to an object, forward extensions thereon, a light-box secured to said forward extensions having an opening along its under side, a clip for engaging the lower edge of the sign-plate, and coiled springs for drawing the clip toward the forward extensions to hold the sign-plate between them, substantially as described.

3. A sign-plate holder consisting of an upper support for engaging the upper edge of the sign-plate comprising a supporting plate adapted to be stationarily secured to an object and forward extensions on said plate, a light box secured to said support having a downwardly extended lip and having an opening along its under side, a lower support for engaging the lower edge of the sign-plate, and means for drawing the lower support toward said extensions to hold the sign-plate between them, substantially as described.

4. A sign-plate holder consisting of an upper support for engaging the upper edge of the sign-plate and adapted to be stationarily secured to an object, a light box secured thereto having an opening along its under side, and another opening above the aforesaid opening, a colored lens supported in front of said last named opening, a light contained in said box above the opening in the under side thereof, and back of the other opening, a lower support for engaging the lower edge of the sign-plate, and means for drawing the lower support toward the upper support to hold the sign-plate between them, substantially as described.

In testimony whereof, I have signed my name to this specification, in the presence of two subscribing witnesses.

BERNARD J. FOY.

Witnesses:
  L. H. HAMMAN,
  H. B. DAVIS.